United States Patent Office 3,264,320
Patented August 2, 1966

3,264,320
1,3,4-OXADIAZOLE-2,5-DIYL-BIS-BENZHYDRA-ZIDE AND ITS PREPARATION
Jack Preston, Raleigh, N.C., assignor to Monsanto Company, a corporation of Delaware
No Drawing. Original application July 19, 1963, Ser. No. 296,397. Divided and this application Nov. 8, 1965, Ser. No. 506,848
2 Claims. (Cl. 260—307)

This is a division of application Serial No. 296,397, filed July 19, 1963, and now abandoned.

This invention relates to new dihydrazides. More particularly, the invention relates to the provision and preparation of new aromatic dihydrazides containing oxadiazole linkages.

Polyamides have been found to be very thermally resistant in the form of certain compositions. Improvements have been sought, however, on the theory that condensation polymers having heterocyclic in the main chain instead of amide linkages will be more stable because of several considerations. Heterocyclic rings should be very stable because of resonance. Also, when a heterocyclic ring is ruptured, the polymer chain may still not be cleaved. At the present, polyheterocycles have been difficult to prepare in high molecular weight although they have proved to be thermally resistant materials. This invention presents new intermediates, arylhydrazides joined by means of heterocyclic linkages, which may be polymerized to materials having thermally stable heterocyclic linkages. These intermediates, which are novel dihydrazides may be polymerized to high molecular weight polymers in a very simple manner. The resulting polymers, for example polyhydrazide heterocycles, will possess characteristics of both wholly aromatic polyamides and polyheterocycles.

It is an object of the invention to provide new aromatic dihydrazides containing heterocyclic linkages.

Another object is to provide new aromatic dihydrazides containing oxadiazole linkages.

It is another object of the invention to provide a process for the preparation of aromatic dihydrazides containing oxadiazole linkages. An additional object of the invention is to provide new aromatic dihydrazides containing oxadiazole linkages which are of high temperature resistance and which are suitable as intermediates in the preparation of high molecular weight thermally resistant polymers.

Other objects and advantages of the invention will become apparent from the description which follows.

In general, the objects of the invention are attained by the provision of aromatic dihydrazides which contain a central heterocyclic linkage bound on each side by means of divalent aromatic hydrocarbon radicals which are terminated with hydrazide groups.

These new dihydrazides may be represented by the general formula

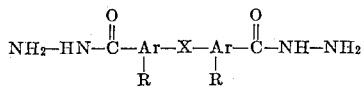

wherein Ar is a divalent aromatic hydrocarbon radical having from 1 to 15 carbon atoms which may be selected from single, multiple and fused ring radicals, and R may be H or other inert substituent, and wherein X represents a heterocyclic linkage which contains 5 to 6 ring members and which contains at least one of O, N and S in the ring.

The divalent aromatic hydrocarbon radicals may be, for example

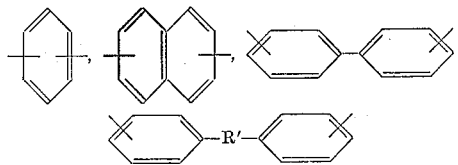

wherein R' is —O—, —S—, —SO$_2$—, —CH$_2$, $$\overset{|}{\underset{|}{C(CH_3)_2}}$$

and similar aromatic radicals.

The heterocyclic linkages are exemplified by

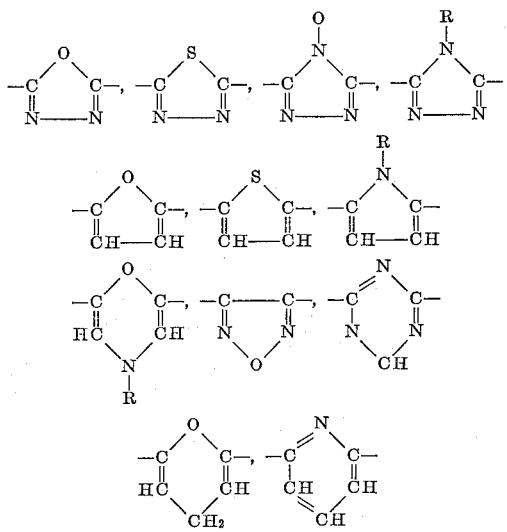

and the like, where R=H, or lower alkyl.

A dihydrazide of this general formula, for example, is

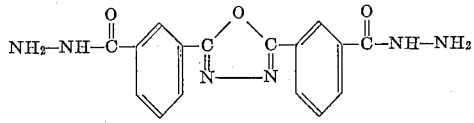

2,5-bis(m-benzoylhydrazine)-1,3,4-oxadiazole

The method of preparation of the new heterocyclic containing diamines of this invention in general is accomplished by the preparation of a diester intermediate which is then reacted with hydrazine to yield the diamino compound containing heterocyclic linkages. The heterocyclic linkage itself is formed prior to the time that the dihydrazide is introduced, and the preparation of the dihydrazide compound does not involve the heterocyclic linkage itself.

The diester intermediate may be prepared by any of several well known methods. A 1,3,4-oxadiazole linkage may be formed from a hydrazide linkage which may be formed in solution or via a Schotten-Baumann reaction. The Schotten-Baumann or interfacial type reaction involves the use of an ester acid chloride either alone or in a suitable solvent which will dissolve the ester acid chloride and which will at the same time not adversely affect the other component which is dissolved or dispersed in water. Suitable solvents include chloroform, tetrahydrofuran, benzene, benzonitrile, acetophenone, acetonitrile, dimethylacetamide, and other solvents; tetrahydrofuran being preferred. The reaction mixture is then stirred rapidly until the reaction is completed and the diester compound is filtered from the reaction mixture. The choice of intermediate reactants will, of course, depend upon the type of heterocyclic linkage desired. For example, the reaction of m-carboethoxy benzoyl chloride plus hydrazine in a basic reaction media will produce a dicarboethoxyl hydrazide intermediate which may then be converted by a dehydrating agent, such as phosphorous oxychloride, thionyl chloride, or acetic anhydride, to a dicarboethoxy intermediate compound containing a 1,3,4-oxadiazole linkage. The hydrazide intermediate may also be produced in a solvent, such as dimethylacetamide. The diester compound containing the oxadiazole linkage may then be converted to the dihydrazide compound.

It is also possible to prepare the dinitro hetero-containing intermediate in a one-step synthesis. For example, the reaction of N-phenyl-m-nitrobenzimide chloride and m-nitrobenzoyl hydrazide yields the dinitro intermediate containing a 1,2,4-triazole linkage directly.

Other heterocyclic linkages may be preformed readily in the compositions of this invention. A heterocyclic linkage that may be obtained in high yield and well illustrates the principle is a thiadiazole unit formed from a hydrazide group by reaction with $P_2S_5$ in pyridine or from a thiohydrazide and an aroyl chloride followed by heating. Other heterocyclic units that may be formed by appropriate reactions include pyrazine, pyrazole, etc.

The conversion of the diester intermediate to the dihydrazide may be effected by any of the well known methods. For example, excess hydrazine may be refluxed with the diester in alcohol.

The amounts of the various reactants which may be employed will, of course, depend on the type of hydrazide linkage which is desired. In general, it may be stated that substantially equimolar proportions of the various reactants may be employed.

The novel dihydrazides of this invention are useful in a variety of applications. They may be polymerized to high molecular weight polyhydrazide heterocyclics in a very simple manner. Thus, the physical properties of a polymer may be easily predetermined by selecting the proper aryl group and the proper heterocyclic group.

The reactivity of these compounds makes them useful in those reactions common to phenylenediamines. Unlike the phenylenediamines which are subject of discoloration through oxidation, they are resistant to attack from air, light, moisture and common organic solvents. These novel dihydrazides are thus more useful than phenylenediamine for many uses, such as the curing of epoxy resins to give products of good color.

The following example is presented as a further disclosure and illustration of the new compositions of this invention and is not intended as a limitation thereof. All parts, proportions and percentages are by weight unless otherwise indicated.

EXAMPLE

A solution of 9 g. of m-carboethoxybenzoyl chloride prepared according to the method of Cohen et al. [J. Chem. Soc., 113, 62 (1918)] in 20 ml. of tetrahydrofuran was added to 2.6 g. of hydrazine sulfate in 100 g. of water and ice, 8 g. of sodium bicarbonate was added and the mixture blended for 10 minutes. The product, N,N'-bis(m-carboethoxybenzoyl) hydrazide was obtained in a 7.7 g. yield. The hydrazide was converted to the oxadiazole, 2,5-bis(m-carboethoxyphenyl)-1,3,4 - oxadiazole, by the reaction of refluxing phosphorus oxychloride. Excess oxychloride was removed and the residue recrystallized with ethanol. There was obtained 17.8 g. of 2,5-bis(m-carboethoxyphenyl)-1,3,4-oxadiazole, M.P. 133–134° C. A solution of 8 g. of 2,5-bis(m-carboethoxyphenyl)-1,3,4-oxadiazole in 300 ml. of methanol was refluxed with 9 g. of 95 percent hydrazine for 3 hours. The solution was cooled and 2.8 g. of 2,5-(m-benzoylhydrazine)-1,3,4-oxadiazole was separated.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the invention is intended to be included within the scope of the claims.

I claim:

1. As a new composition of matter

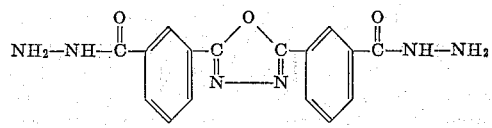

2. A process for the preparation of 2,5-bis(m-benzoylhydrazine)-1,3,4-oxadiazole

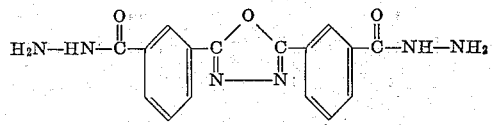

comprising adding with stirring a solution of 9 g. of m-carboethoxybenzoyl chloride in tetrahydrofuran to 2.6 g. of aqueous hydrazine sulfate containing 8 g. sodium carbonate to form N,N'-bis(m-carboethoxybenzoyl)hydrazide, dehydrating said hydrazide to form 2,5-bis(m-carboethoxyphenyl)-1,3,4-oxadiazole, subjecting 2,5-bis(m-carboethoxyphenyl)-1,3,4-oxadiazole to the reaction of hydrazine to form 2,5-bis(m-benzoylhydrazine)-1,3,4-oxadiazole.

No references cited.

HENRY R. JILES, Acting Primary Examiner.

ALTON D. ROLLINS, Assistant Examiner.